Aug. 25, 1925.

J. L. SHROYER

ELECTRIC TOASTER

Filed June 11, 1923

1,551,336

Inventor:
Jacob L. Shroyer,
by
His Attorney.

Patented Aug. 25, 1925.

1,551,336

UNITED STATES PATENT OFFICE.

JACOB L. SHROYER, OF CHICAGO, ILLINOIS, ASSIGNOR TO EDISON ELECTRIC APPLIANCE COMPANY, INCORPORATED, OF CHICAGO, ILLINOIS, A CORPORATION OF NEW YORK.

ELECTRIC TOASTER.

Application filed June 11, 1923. Serial No. 644,527.

*To all whom it may concern:*

Be it known that I, JACOB L. SHROYER, a citizen of the United States, residing at Chicago, in the county of Cook, State of Illinois, have invented certain new and useful Improvements in Electric Toasters, of which the following is a specification.

My invention relates to electric toasters and has for its object the provision of a simple, reliable and efficient device of this character.

More specifically my invention relates to toasters of the type provided with a plurality of parallel spaced heating devices between which the slice is placed so as to be toasted on both sides at the same time. Such toasters may be provided with any desired number of heating devices for toasting a corresponding number of slices. In a common form of this toaster, baskets, forming slice holders, are pivotally mounted between the heating devices in such manner as to be movable out of the toasting position between the heating devices to permit the insertion and removal of the slice.

In carrying out my invention I provide guards for the heating devices which at the same time act as sides for the slice holding means. Pivotally mounted between each pair of guards is a supporting member which normally is in a horizontal position to support the slice while toasting, and which can be moved about its pivot so as to throw out the slice.

Figure 1:
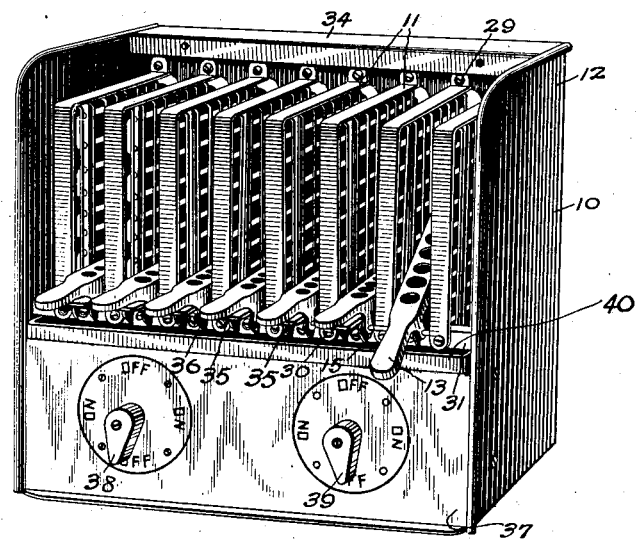
Figure 2:
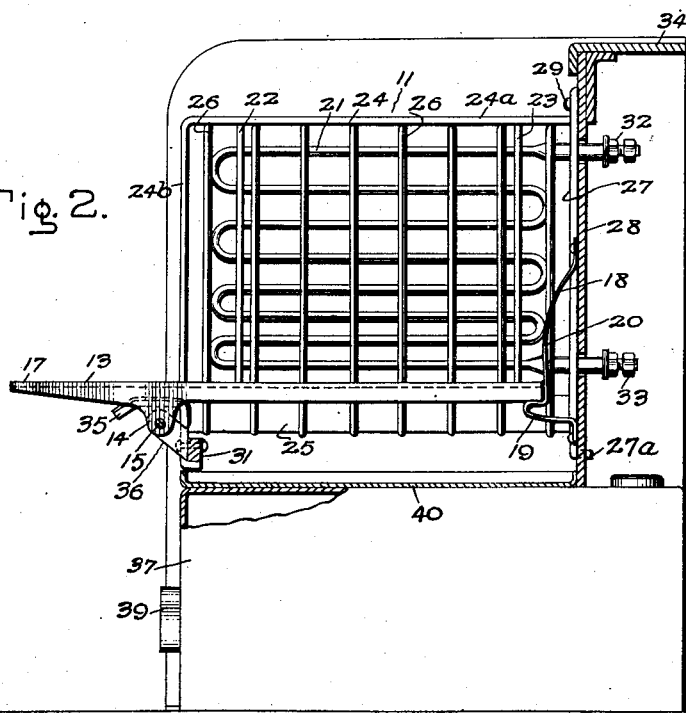

For a more complete understanding of my invention reference should be had to the accompanying drawing in which Fig. 1 is a perspective view of an electric toaster embodying my invention, while Fig. 2 is a vertical section view of the toaster shown in Fig. 1.

Referring to the drawing, the toaster 10 in one form of my invention comprises a plurality of heating devices 11 mounted in a suitable supporting casing 12. These heating devices are mounted vertically and in spaced and parallel relation, the space between each adjacent pair of devices being substantially equal to the width of the average slice of bread to be toasted. Between adjacent pairs of heating devices near their lower edges are supporting members 13 for the slice. These supporting members are in the form of straight bars. They preferably are stamped or otherwise formed from sheet metal having flanged edges and each being provided with a pair of lugs 14 extending downwardly from its lower side. The lugs 14 are situated near the outer end of the supporting member and are provided with suitable apertures through which extends a rod 15 mounted on the front of the toaster and forming a common pivot for the various supporting members. The outer end of each supporting member projects for a short distance from between the heating devices and forms a handle 17 by means of which the supporting member may be moved about its pivot. A strap member 18 is provided for supporting the rear end of each supporting member. This member has a projection 19 forming a stop or rest for the inner end of the supporting member when it is in a horizontal position. The upper portion 20 of the member acts as a stop for the back edge of the slice.

The heating devices 11 each comprise a suitable sheathed wire heating unit 21 which is bent back and forth in zigzag form and threaded through vertical supporting bars 22 and 23 situated near the ends of the various loops of the unit and forming part of a supporting framework therefor. The upper ends of the bars 22 and 23 are secured to the horizontal portion 24$^a$ of a right angle strap or supporting member 24 which has a vertical portion 24$^b$ extending downward in front of the loops of the heating unit. The lower ends of the bars 22 and 23 are secured to a horizontally extending member 25 having its left hand end secured to member 24. A plurality of vertical guard rods 26 are provided on each side of the heating unit secured at their upper and lower ends to the members 24 and 25 respectively. The inner or right hand ends of the members 24 and 25 are connected by an upright plate member 27 which engages with the back wall 28 of the supporting casing 10. As shown, each heating device 11 is secured to the casing 10 by means of two screws or bolts 29 and 30, bolt 29 passing through the upper end of member 27 and wall 28 and bolt 30 passing through the lower end of member 24 and a transversely extending bar 31 secured to casing 10. On the lower end of member 27 is a laterally extending lug 27$^a$ which fits in an aperture in wall 28. The terminals 32 and 33 for the heating element 21 project from the back side of the casing and are protected from grease and other deposits by the overhanging portion 34 of the casing. It will be observed that the heating devices comprising the sheathed wire heating units and their supporting framework thus form unitary structures which are easily removable for repair or renewal independently of each other by disconnecting the terminals and removing bolts 29 and 30.

Movement of the outer end 17 of each supporting member 13 is limited by means of a stop 35 secured to bar 31 underneath the supporting member. Each of these stops is provided with a pair of lugs 36 which fit between the lugs 14 on the supporting member in the manner of a hinge and act as supports for the common pivot rod 15.

In the lower part of the toaster is a compartment 37 for suitable control switches for controlling the heating devices. As shown two control switches operated by handles 38 and 39 from the front of the toaster are provided whereby the heating devices are divided into two groups which may be controlled independently of each other. A crumb tray 40 is provided underneath the heating elements. It is removable from the front of the toaster.

In the operation of the toaster the guard rods 26 on two adjacent heating devices act as side supports for a slice placed between them, the slice resting at the bottom on the supporting member 13. When it is desired to remove a slice of bread which has been toasted to the proper degree, the outer end 17 of the supporting member is quickly depressed or struck downward, whereby the slice is thrown from the toaster. It will be observed that the toast can be removed much easier and more quickly than with previous devices. The toast can be removed with one hand while with the basket for the slice, for example, both hands may be required.

For the purpose of giving the supporting member a quicker action in throwing out the slice, and for preventing rebound of the slice holder when it is returned to horizontal position, the upper end 20 of member 18 may be arranged to frictionally engage the inner end of the supporting member. I have found that this construction is not essential for satisfactory operation, however.

While I have described my invention as embodied in concrete form and as operating in a specific manner in accordance with the provisions of the patent statutes, it should be understood that I do not limit my invention thereto, since various modifications thereof will suggest themselves to those skilled in the art without departing from the spirit of my invention, the scope of which is set forth in the annexed claims.

What I claim as new and desire to secure by Letters Patent of the United States, is:—

1. An electric toaster comprising a plurality of electric heating devices arranged in substantially vertical parallel planes, guards carried by said heating devices forming side supports for a slice placed between said heating devices, and a member movably mounted between said heating devices forming a bottom support for the slice, said member being movable between said heating devices to eject the slice.

2. An electric toaster comprising a plurality of electric heating devices arranged substantially vertically in spaced relation, guards carried by said heating devices forming side supports for a slice placed on edge between said heating devices, and a normally horizontal bar pivotally mounted between said heating devices forming a bottom support for the slice, one end of said bar projecting from between said heating devices, whereby said projecting end may be struck downward and the slice supporting portion of said bar thereby thrown upward on its pivot to eject the slice.

3. An electric toaster comprising a plurality of electric heating devices arranged substantially vertically in spaced relation, guards carried by said heating devices forming side supports for a slice placed on edge between said heating devices, a normally horizontal bar pivotally mounted between said heating devices forming a bottom support for the slice, a rest for the inner end of said bar, the outer end of said bar projecting from between said heating devices whereby said outer end may be struck downward and the inner portion of said bar thereby thrown upward to eject the slice, and a stop for limiting the movement of said bar.

4. An electric toaster comprising an open front casing, a supporting member extending across the front of said casing, a pair of vertically arranged electric heating devices detachably secured to said member and casing in spaced relation, guards carried by said heating devices forming side supports for a slice placed on edge between said heating devices, a normally horizontal bar forming a bottom support for the slice pivotally mounted near its outer end on said supporting member, the outer end of said bar projecting from between said heating devices to form a handle, whereby said handle may be struck downward and the slice supporting portion of said bar thereby thrown upward on its pivot to eject the slice at the end of the toasting operation, a stop for limiting the movement of said bar on its pivot in ejecting the slice, and a rest for the inner end of said bar provided with an extension forming a stop for the rear edge of the slice.

5. An electric toaster comprising an open front casing, a supporting member extending across the front of said casing, a plurality of electric heating devices detachably secured to said member and casing in upright spaced relation, a slice support pivotally mounted on said member and movable between said heating devices, and a stop carried by said member for limiting the movement of said slice support thereon.

In witness whereof, I have hereunto set my hand this 23 day of May, 1923.

JACOB L. SHROYER.